INVENTORS
TOSHIO DOI
MASAO MITANI
MASARU KOBAYASHI
HIDEHARU OHARA
SENJIRO MAEDA

BY Paul M. Craig, Jr.
ATTORNEY

INVENTORS
TOSHIO DOI
MASAO MITANI
MASARU KOBAYASHI
HIDEHARU OHARA
SEIJIRO MAEDA

BY Paul M. Craig, Jr.
ATTORNEY

INVENTORS
TOSHIO DOI
MASAO MITANI
MASARU KOBAYASHI
HIDEHARU OHARA
SENJIRO MAEDA

BY Paul M. Craig, Jr.
ATTORNEY

INVENTORS
TOSHIO DOI
MASAO MITANI
MASARU KOBAYASHI
HIDEHARU OHARA
SEIJIRO MAEDA

BY Paul M. Craig, Jr.
ATTORNEY

INVENTORS
TOSHIO DOI
MASAO MITANI
MASARU KOBAYASHI
HIDEHARU OHARA
SEIJIRO MAEDA

BY

Paul M. Craig, Jr.
ATTORNEY

INVENTORS
TOSHIO DOI
MASAO MITANI
MASARU KOBAYASHI
HIDEHARU OHARA
SEIJIRO MAEDA

BY Paul M. Craig, Jr.
ATTORNEY

United States Patent Office 3,408,604

Patented Oct. 29, 1968

3,408,604

SUPERCONDUCTING ALLOYS AND APPARATUS FOR GENERATING SUPERCONDUCTING MAGNETIC FIELD

Toshio Doi, Masao Mitani, Masaru Kobayashi, and Hideharu Ohara, Tokyo, and Seijiro Maeda, Fuchu-shi, Japan, assignors to Hitachi, Ltd., Tokyo, Japan, a corporation of Japan Continuation-in-part of application Ser. No. 390,821, Aug. 20, 1964. This application Mar. 6, 1967, Ser. No. 620,936

Claims priority, application Japan, Oct. 23, 1963, 38/56,102

11 Claims. (Cl. 335—216)

ABSTRACT OF THE DISCLOSURE

A superconducting magnet containing at least one coil made of an alloy having superconductivity at a temperature below its critical temperature, said alloy consisting essentially of about 20 to 63 atomic percent niobium, about 1 to 79 atomic percent zirconium and about 1 to 79 percent titanium. The superconducting alloys of the present disclosure find application in superconducting magnets for magnetic hydrodynamic generators and in coils for magnets which provide the driving force in submarines.

*Background of the invention*

This is a continuation-in-part application of application Ser. No. 390,821, filed in the United States Patent Office on Aug. 20, 1964, now abandoned.

The present invention relates to hard superconducting alloys comprising a ternary system consisting essentially of niobium, zirconium and titanium. The present invention also concerns superconducting magnetic field generating devices utilizing said alloys as coil windings therefor.

Superconductivity is the phenomenon wherein the electric resistance of certain substances is reduced to zero when cooled to a verp low temperature. Substances having such a property, that is, so-called superconducting materials, generally exhibit the following three characteristics: They have a critical temperature ($T_c$), that is a temperature below which a substance becomes superconductive; a resistive critical field ($H_r$), that is, a magnetic field strength above which the superconductivity of a substance is destroyed by flowing an extremely low current therethrough; and a critical current ($I_c$) or a critical current density ($J_c$), that is, a current or a current density above which the superconductivity of a substance is destroyed.

Superconducting materials are generally categorized into the so-called "soft" superconducting materials and the "hard" superconducting materials. The term "hard" superconducting material designates a class of superconducting material, which superconductivity is destroyed gradually upon reaching its critical magnetic field, as contrasted with "soft" superconducting material which is restored to its normal resistive state rather abruptly upon reaching its critical magnetic field. Although substantially all of the superconducting elements fall into the category of "soft" superconducting materials, those alloys and intermetallic compounds having superconductivity fall in the category of "hard" superconducting materials.

In using a hard superconducting material as a coil winding for a superconducting magnet, it is necessary for the characteristics discussed above to meet the following requirements. The critical temperature of the material is preferably higher than about 4.2° K. Because the coil must be operated at a temperature below the critical temperature of the material of which said coil is made and the coil is usually operated in liquid helium whose temperature is 4.2° K. With respect to the low current density resistive field and the critical current, the maximum capacity of current possibly flowing through the coil is restricted by the critical current, while the transverse magnetic field to be generated depends upon the magnetic field dependency curve $I_c$–H with its upper limit being the low current density resistive field ($H_r$). Thus, it can be appreciated that the material used for forming the coil windings should have the highest possible values of critical temperature ($T_c$), low current density resistive field ($H_r$) and critical current ($I_c$).

The critical current of a material, as previously described, is the highest possible current carrying capacity which can be obtained by gradually increasing a direct current flow through a rectilinear wire of said material without destroying its superconductivity when the wire is placed in an applied transverse magnetic field of a given strength H. In some cases, the value of this critical current increases as the same measuring operation is repeated until it finally reaches a stabilized level. Such a phenomenon is called the "current training effect" and this stabilized value of the critical current is regarded as the true critical current value. The critical current of the material is more degraded when the material is wound into a coil than when it is in the rectilinear state as in the case mentioned above. This phenomenon is called the "coil current degradation effect." Since these two effects are closely related to each other, that is, that a material having a large training effect generally has a large current degradation effect, the material which is used as a coil is required to have both a small coil current degradation effect and a small current training effect. It is also desirable that the material possess plastic deformation, that is, be readily workable, since it is frequently used in the form of a wire or ribbon in the formation of coils. Additionally, it is advantageous if the material is inexpensive to produce.

Heretofore, niobium-zirconium, niobium-titanium, vanadium-titanium and molybdenum-rhenium binary alloys have been known as hard superconducting alloys capable of plastic deformation and exhibiting superconductivity properties. Among these alloys, niobium-zirconium alloys are regarded as having particularly desirable superconductivity and much research is being conducted to further develop these alloys. Alloys of this type are well known and are in frequent use in many applications. Investigations by the present inventors on the presently marketed niobium-zirconium alloy containing about 25 atomic percent niobium and about 75 atomic percent zirconium have revealed that the critical temperature is about 10.9° K., and that the critical current density in an applied transverse magnetic field of about 60K oe. (kilo oersteds) is about $5\times10^4$ amp./cm.$^2$, whereas the critical current density in an applied transverse magnetic field of about 70K oe. is about 0 amp./cm.$^2$. This indicates that the superconducting state is destroyed. As can be readily appreciated from the foregoing data, the presently used binary alloy is not usable in a strong transverse magnetic field having a strength of about 70K oe. or greater and also has the additional drawbacks that a coil formed of a wire of this alloy exhibits a large current degradation effect and a large current training effect. The alloy has the further drawbacks that it is costly since both niobium and zirconium are expensive metals and that the plastic deformation of the alloy is relatively difficult to achieve.

Throughout the specification, the various characteristics of the niobium-zirconium and niobium-titanium binary alloys will be described in comparison to the ternary alloys of the present invention.

Accordingly, it is an object of the present invention to provide a hard superconducting alloy having improved superconducting characteristics.

Another object of the present invention is to provide a hard superconducting alloy having a high critical current value even in a transverse magnetic field with a strength greater than about 80K oe.

A further object of the present invention is to provide a hard superconducting alloy having a high value of low current density resistive field ($H_r$), exceeding about 100K oe., although the critical current thereof may be somewhat small.

A still further object of the present invention is to provide a hard superconducting alloy wherein the coil current degradation effect and the current training effect are small.

A yet another object of the present invention is to provide hard superconducting alloys which possess plastic deformation.

A still another object of the present invention is to provide a superconducting magnetic field generating device provided with a coil comprising a ternary superconducting alloy of the present invention, said coil having a small current degradation effect and a small current training effect and said coil being capable of receiving a large current flowing therethrough even in a strong transverse magnetic field.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

*Summary of the invention*

The hard superconducting alloys of the present invention are ternary alloys which comprise about 20 to 63% niobium, about 1 to 79% zirconium and about 1 to 79% titanium. More advantageously, the alloys of the present invention have a composition which, in the triangle diagrams of the niobium-zirconium-titanium ternary alloy system (FIGURES 3*a*, 3*b* and 3*c*), fall within the region defined by the straight lines which connect the following points: 63% niobium, 36% zirconium, 1% titanium; 63% niobium, 27% zirconium, 10% titanium; 52% niobium, 1% zirconium, 47% titanium; 20% niobium, 1% zirconium, 79% titanium; 20% niobium, 12% zirconium, 68% titanium; and 40% niobium, 59% zirconium, 1% titanium. Within the region defined above, alloys comprising about 37 to 59% niobium, about 29 to 53% zirconium and about 1 to 21% titanium and those comprising about 28 to 53% niobium, 1 to 27% zirconium and 27 to 71% titanium are particularly preferable. Alloys composed of about 20 to 63% niobium, about 1 to 20% zirconium and the essential balance titanium are also effective according to the present invention. The percent compositions referred to in this application are all atomic percent.

*Brief description of the drawings*

The present invention will become fully understood from the detailed description hereinbelow and the accompanying drawings which are given by way of illustration only and thus are not limitive of the present invention and wherein.

DESCRIPTION OF THE PREFERRED EMBODIMENTS

*Preparation of samples for measurements*

Figure 1:
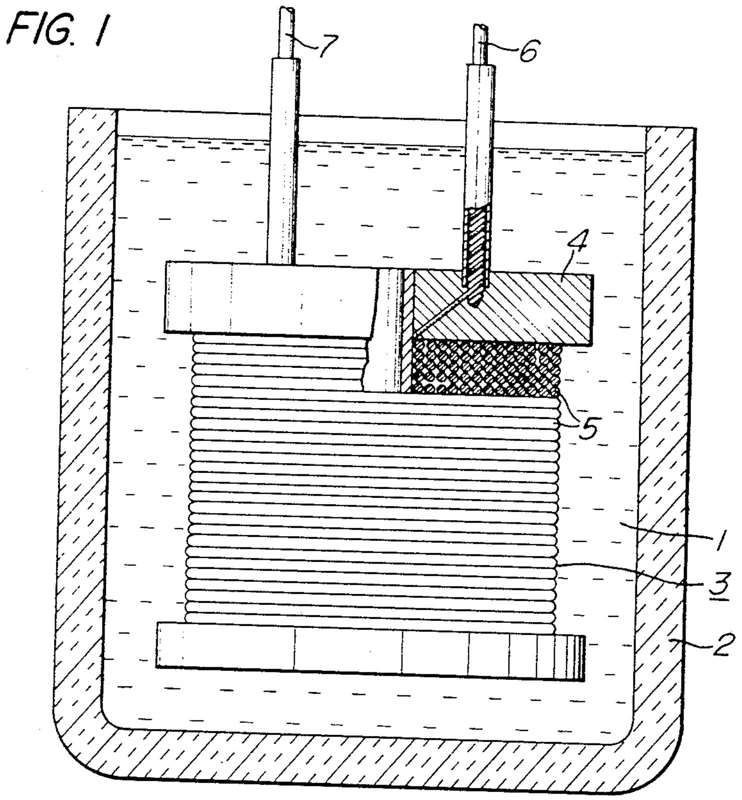
FIGURE 1 shows a side view, partially broken away, of a coil comprising several windings of wire made of a niobium-zirconium-titanium alloy according to the present invention, said coil being disposed in a container filled with liquid helium.

A raw material comprising, for example, about 50% niobium, about 40% zirconium, and about 10% titanium, was melted in an electron beam melting furnace to produce an ingot of 45 millimeters (mm.) in diameter and 300 mm. in length having the above composition. From this ingot, a sample of 4.5 mm. in diameter and 20 mm. in length was cut out and used for measuring the critical temperature. On the other hand, an ingot produced in the manner described above was reduced into a wire of 2.0 mm. in diameter with a grooved roll by hot and cold rolling (plastic deformation) and the resultant wire was subjected to homogenizing heat treatment in a vacuum at 1,100° C. for five hours. The wire was further reduced to a diameter of 1.0 mm. by cold drawing, subjected to further heat treatment in a vacuum at 600° C. for one hour, and thereafter reduced again to a diameter of 0.25 mm. by cold drawing. The wire thus obtained was used for measuring the data for the $I_c$–H curves and other data.

*Determination of critical temperature ($T_c$)*

The sample of 4.5 mm. in diameter and 20 mm. in length produced in the manner described above was placed in a coil of about 100 millihenries and variation in inductance at each temperature was measured by means of a universal bridge of 1 kilocycle. The measurements obtained were plotted into an inductance-temperature curve and the critical temperature was obtained from the point where the inductance varied drastically in said curve. The critical temperature was found to be 9.16° K. The externally applied magnetic field strength produced by the coil used therein was about 10K oe., which produces substantially no influence on the critical temperature.

*Determination of $I_c$–H curve and training effect*

A rectilinear sample 35 mm. in length, produced from the aforementioned sample of 0.25 mm. in diameter, was connected parallel with a manganin-made shunt resistance which has a resistance value of 2 milliohms at 4.2° K. and said sample was so placed that the flowing direction of a current through said wire would be substantially at right angles to the transverse magnetic field to be applied. First of all, a direct current was conducted through the sample from an external power source without applying an external transverse magnetic field and current was increased progressively from zero to the critical current at the rate of about 200 amp./min. The amperage of the current flowing through said sample was measured when a voltage of 5 micro volts was developed at a voltage terminal leading from a shunt resistance. This operation was repeated several times until the current value was stabilized. This stabilized current was measured for use as the critical current without an applied transverse magnetic field. Then the same operation as described above was repeated in an external transverse magnetic field of 10K oe. applied to said sample, until the current value was stabilized. Subsequently, the transverse magnetic field strength was increased step-wise in 10K oe. increments to about 100K oe., during which period measurements were taken in a simliar manner. All of these measurements were taken at a helium temperature of 4.2° K. and the connections between the voltage and amperage terminals and the sample were effected by supersonic soldering using indium solder The training effect was checked by the repeating operations of current stabilization at the externally applied transverse magnetic field strength of 20K oe. in the manner mentioned above.

*Determination of the coil current degradation effect*

A plurality of small coils having an inner diameter of 12 mm. and a length of 30 mm. were produced with the aforementioned 0.25 mm. diameter sample wire which has previously been electrolytically plated with copper in a thickness of 35 microns, with the subsequent insulation of the plated surface with a polyimide resin. These coils were maintained at a temperature of 4.2° K. and the current value $I_{coil}$ at which the superconductivity of the coils were destroyed was measured and recorded in Table 1 below. On the other hand, the maximum current value reached upon training effect of a short rectilinear sample wire, that is, the critical current, was measured and recorded in Table 1 below. The degree of current degradation effects was figured from the ratio between the $I_{coil}$ and $I_c$ thus obtained. In all cases, the central magnetic flux densities produced in said coil were about 20 kilo gauss.

Referring now to the accompanying drawings and first to FIGURE 1, there is shown a coil 3 of 12 mm. in inner diameter, 40 mm. outer diameter and 30 mm. in height, which is immersed in liquid helium 1 contained in a Dewar's vessel 2. The coil 3 is made with a niobium-zirconium-titanium alloy wire 5 of the present invention and wound on a copper core frame 4. Both ends of the coil are connected to terminal leads 6 and 7, respectively, for connection with an external power source, not shown.

Figure 2:
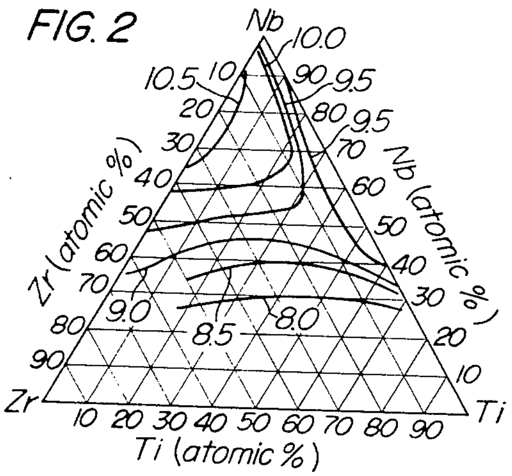
FIGURE 2 is a triangle diagram of niobium-zirconium-titanium alloys showing the isothermal relationship between the critical temperature and the composition of the niobium-zirconium-titanium alloys, wherein the critical temperatures in degrees Kelvin are shown by the numerical values.

From FIGURE 2, it will be apparent that niobium-zirconium-titanium alloys containing a small amount of titanium and from about 10 to 35% zirconium have a critical temperature higher than 10.5° K. and the value of the critical temperature decreases as the zirconium and titanium contents increase, and further that a niobium-zirconium-titanium alloy in which the total amount of zirconium and titanium is about 70%, has a critical temperature of about 8.0° K. It will also be understood from the diagram that the alloys of the present invention generally have a critical temperature ranging from about 8 to 10° K.

Figure 3A:
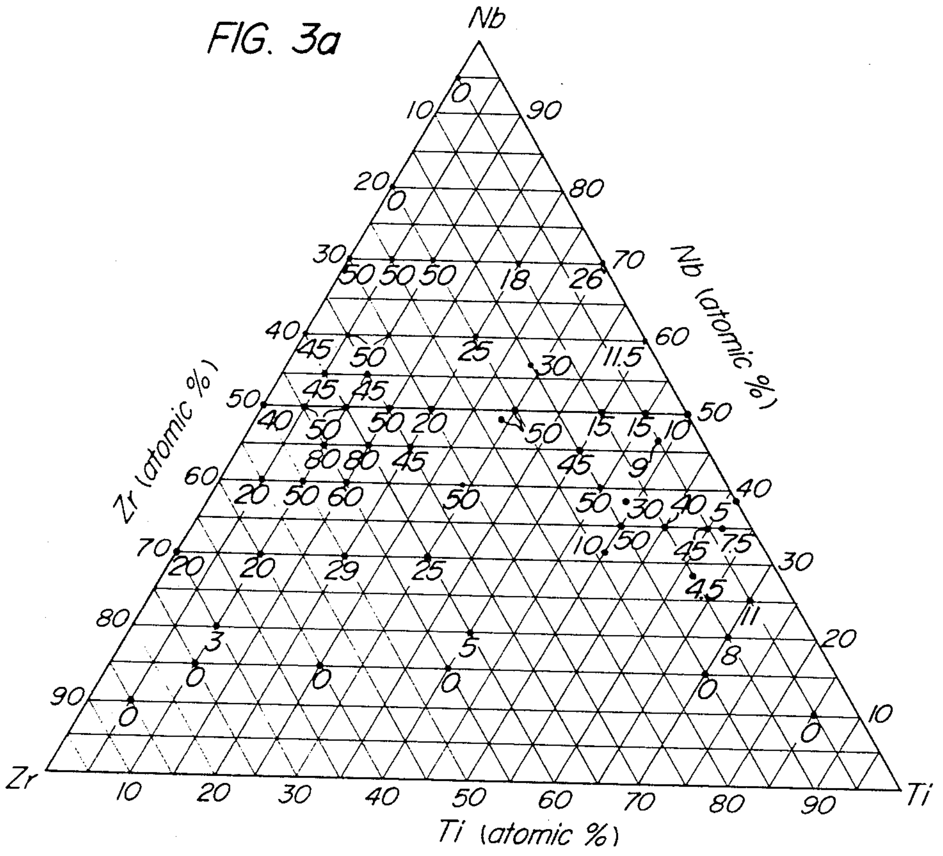
FIGURES 3*a*, 3*b* and 3*c* are the triangle diagrams of niobium-zirconium-titanium alloys plotted with the critical current values at applied transverse magnetic field strength of 50, 70 and 80 K oe. obtained from the measured $I_c$–H curves respectively, wherein the critical current values in amperes of 0.25 mm. diameter samples are shown by the numerical values.
Figure 3B:
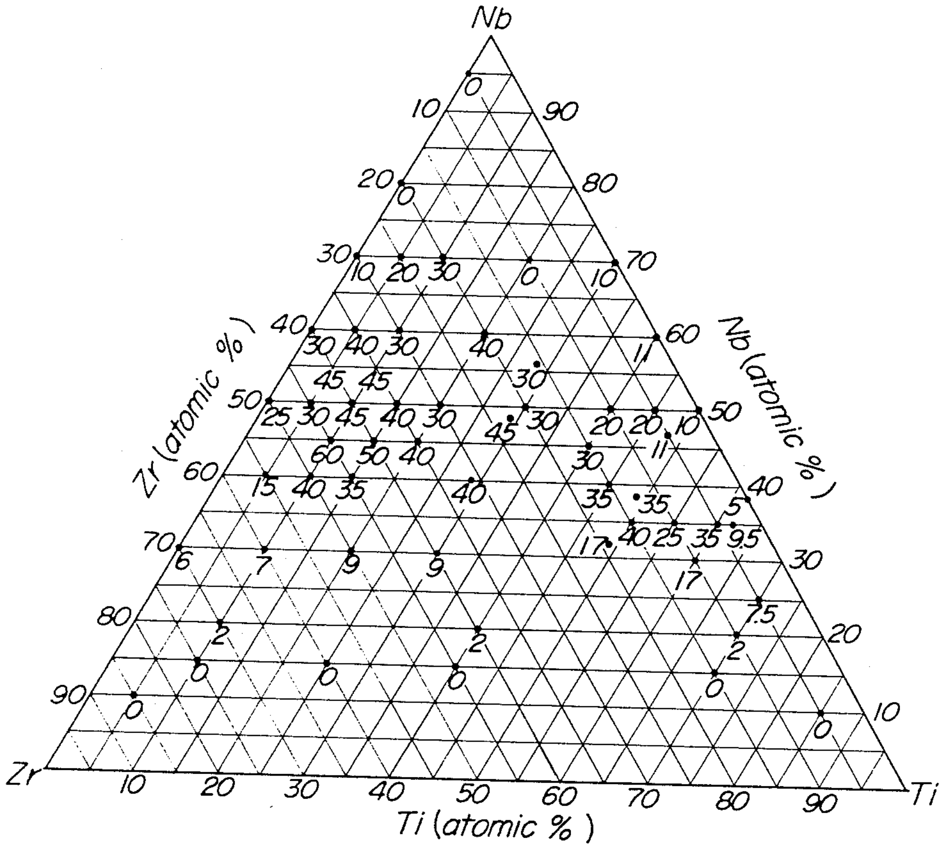
Figure 3C:
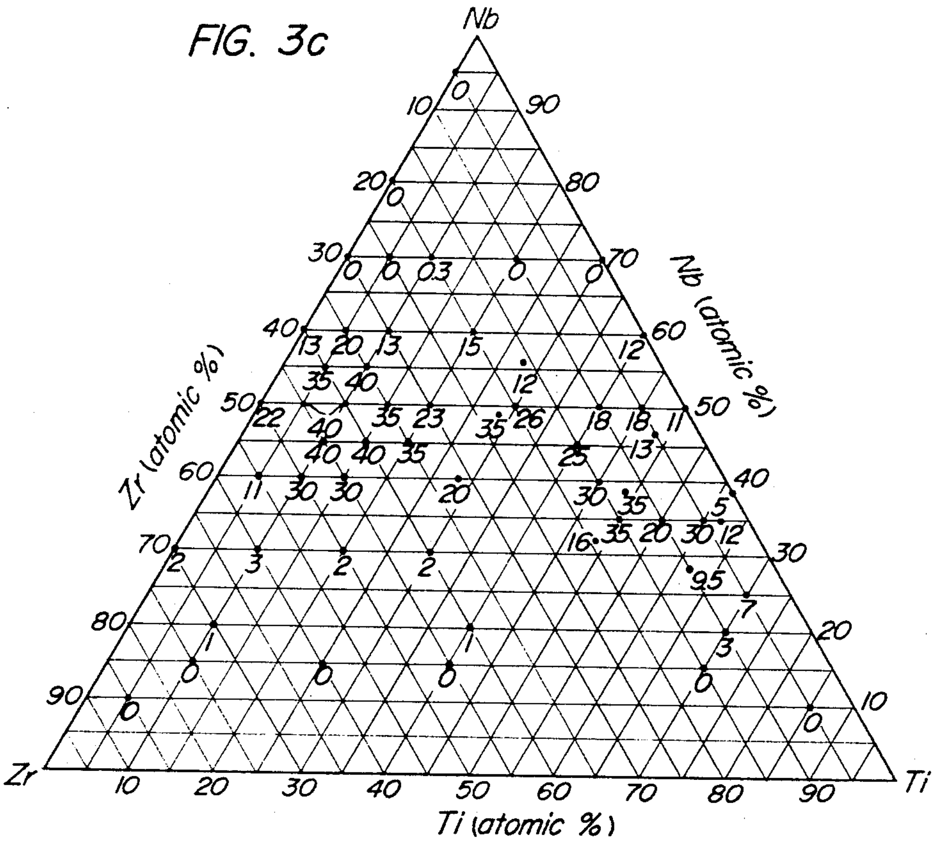

From FIGURES 3*a*, 3*b*, and 3*c*, it will be understood that alloys of the present invention composed of about 20 to 63% niobium, about 1 to 79% zirconium and about 1 to 79% titanium will not lose their superconductivity even in an applied transverse magnetic field of about 80K oe., and that alloys in a transverse magnetic field strength ranging from about 50 to 80K oe., have a critical current greater than that of niobium-zirconium binary alloys and niobium-titanium binary alloys.

The results of measurement of the $I_c$–H curves for alloys of various compositions, which were conducted for the preparation of the diagrams shown in FIGURES 3*a*, 3*b* and 3*c*, have revealed that, when the zirconium plus titanium content is more than the compositions lying on the line combining the point 47% zirconium–53% niobium with the point 67% titanium–33% niobium, the resistive critical field of the alloys tends to become higher. However, when the niobium content is not greater than 20%, that is, when the zirconium plus titanium content exceeds 80%, the critical current of the alloys at 4.2° K. tends to drop off in a transverse magnetic field of a strength higher than about 50K oe., so that the alloys show no superconductivity. Therefore, the desirable lower limit of niobium content is about 20%. In the range of about 20 to 30% niobium content, it is difficult to flow a large current through the alloys but there is the advantage that the alloys retain their superconductivity in an extremely strong applied transverse magnetic field of even up to, for example, about 120 to 130K oe.

From FIGURES 3*a*, 3*b*, 3*c* and 6, it can be seen that the alloys of the present invention with a lower niobium content of about 20% show superconductivity only in a transverse magnetic field of low strength, for example, about 50K oe. However, as the niobium content increases up to about 63%, it is possible to conduct a superconducting current through said alloys even in a magnetic field strength as high as 80K oe.

FIGURES 3*a*, 3*b*, 3*c*, 4 and 5 show how much a small amount of titanium is effective in increasing the critical current of niobium-zirconium type binary allows when, for example, up to about 5% titanium is added thereto. FIGURES 3*a*, 3*b*, 3*c*, 4, 5 and 7 show how much a small amount of zirconium is effective in increasing the critical current of niobium-titanium type binary alloys when, for example, up to about 5% zirconium is added thereto. This shows that the addition of even 1% of zirconium or titanium is considerably effective.

From FIGURES 3*a*, 3*b*, 3*c*, 6 and 7, it will be understood that ternary alloys wherein the titanium content is constant and ternary alloys wherein the zirconium content is constant have a peak point where the critical current value is highest, and that the alloy compositions corresponding to these peak points generally lie in the triangle diagrams of the niobium-zirconium-titanium alloys in the vicinity of the line combining the point 47% zirconium, 53% niobium with the point 67% titanium-33% niobium. The alloys whose compositions fall in the range of ±13% niobium with respect to said line and on the line of constant titanium content, and which contain 20 to 63% niobium and more than 1% each of zirconium and titanium, show a considerably higher critical current even in a transverse magnetic field having a strength of about 80K oe. or higher.

Reviewing the inventive alloys of the present invention in further detail with reference to the accompanying drawings, the following facts will become apparent.

From FIGURES 3*a*, 3*b*, 3*c*, 4 and 5, it can be seen that the inventive alloys of the present invention can have a composition region located on each of niobium-zirconium and niobium-titanium sides, wherein the critical current is particularly large, and that said regions are defined by (a) about 37 to 59% niobium, about 29 to 53% zirconium and about 1 to 21% titanium and (b) about 28 to 53% niobium, about 1 to 27% zirconium, and about 27 to 71% titanium.

As is clear from FIGURES 3*a*, 3*b* and 3*c*, alloys composed of about 37 to 59% niobium, about 29 to 53% zirconium and about 1 to 21% titanium have a critical current in an applied tansverse magnetic field of 80K oe., of generally about 30 to 40 amperes. In contradistinction thereto, a 50% niobium-50% zirconium alloy having the highest critical current in the niobium-zirconium binary alloys has a critical current of only 22 amperes.

The 50% niobium-50% zirconium alloy showed a large training effect during the critical current measurement, and in a transverse magnetic field of 20K oe., for instance, where the training effect is said to be particularly large, the critical current of the alloy varies from 25 to 45, 43, 81, 120, 122, 130 amperes, and finally stabilized at 130 amperes, which means that seven measurements had to be conducted before the critical current was finally stabilized. A 60% niobium-40% zirconium binary alloy also showed a large training effect. In contrast thereto, the alloys of the present invention showed very little training effect. For example, a 50% niobium-40% zirconium-10% titanium alloy in a transverse magnetic field of 20K oe. showed substantially no training effect and a critical current of 220 amperes was obtained for the first measurement. The critical current of an alloy containing 55% niobium-40% zirconium-5% titanium was stabilized at the second measurement, that is, the critical current for the first measurement was 200 amperes and for the second measurement was 205 amperes. Thus it may be concluded that alloys having a small titanium content show little training effect but the training effect tends to become larger when the titanium content exceeds about 21%. For example, while only three measurements were required for the critical current of a 45% niobium-35% zirconium-20% titanium alloy to be stabilized, the training effect was increased when a niobium-zirconium-titanium alloy containing more than 25% titanium was utilized since five measurements had to be conducted before stabilization of the critical current. In other words, the training effect tends to become large when the titanium content becomes lower than 1% or higher than 21%.

With a niobium content in excess of 59%, the resistive critical field for these alloys is lowered, so that the critical current in a magnetic field as high as 80K oe. drops off. In FIGURE 3*c*, for example, whereas the critical current of a 55% niobium-35% zirconium-10% titanium alloy is 40 amperes, that of a 60% niobium-30% zirconium-10% titanium alloy is as low as 13 amperes.

The critical current of alloys in a magnetic field with a strength as high as 80K oe. also drops off when the niobium content decreases to about 35% or less, primarily because the critical current of these alloys drops. In FIGURE 3*c*, for example, the critical current of a 30% niobium-60% zirconium-10% titanium alloy is only 3 amperes as contrasted to the critical current of 30 amperes for a 40% niobium-50% zirconium-10% titanium alloy.

As can be readily appreciated from FIGURES 3*a*, 3*b*, 3*c* and 6, one of the composition ranges where the alloy of the present invention is particularly effective is when the zirconium content is preferably within the range of about 29 to 53%.

In general, metals and alloys having a body-centered cubic structure undergo a transition from the ductile region into the brittle region as the temperature lowers. The temperature at which such transition takes place is referred to as the brittle-ductile transition temperature. The aforementioned metals and alloys of the present invention have a good plastic deformability at temperatures above said brittle-ductile transition temperature but plastic deformation of the same becomes difficult at temperatures below said transition temperature. Thus, it will be appreciated that for cold deformation, the inventive superconducting alloys having the body-centered cubic structure and primarily composed of niobium are also desired to have a brittle-ductile transition temperature lower than about room temperature.

The brittle-ductile transition temperature of a 50% niobium-50% niobium-50% zirconium alloy ingot, which is in the vicinity of about 100° C., can be lowered by the addition thereto of titanium. Namely, the brittle-ductile transition temperature of a 50% niobium-40% zirconium-10% titanium alloy drops to the vicinity of −50° C. Advantageously, titanium is added in an amount greater than 1% since the addition of only about 1% titanium results in the brittle-ductile transition temperature being in the vicinity of room temperature. It should also be noted that the deformability of this alloy is reduced when the zirconium plus titanium content is about 80% or higher or the niobium content is about 20% or lower. From the foregoing description, it will be apparent that plastic deformation of the alloys of the present invention shows a substantial improvement over the niobium-zirconium binary alloys.

Figure 4:
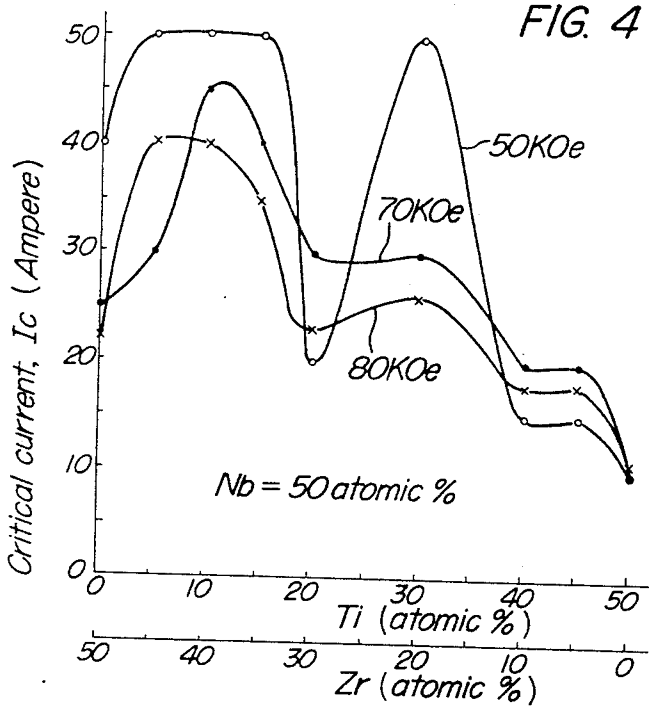
FIGURE 4 shows the relationship between the critical current of 0.25 mm. diameter samples and compositions lying on the line combining the point 50% niobium-50% zirconium with the point 50% niobium-50% titanium, in the triangle diagrams of FIGURES 3*a*, 3*b* and 3*c*.
Figure 5:
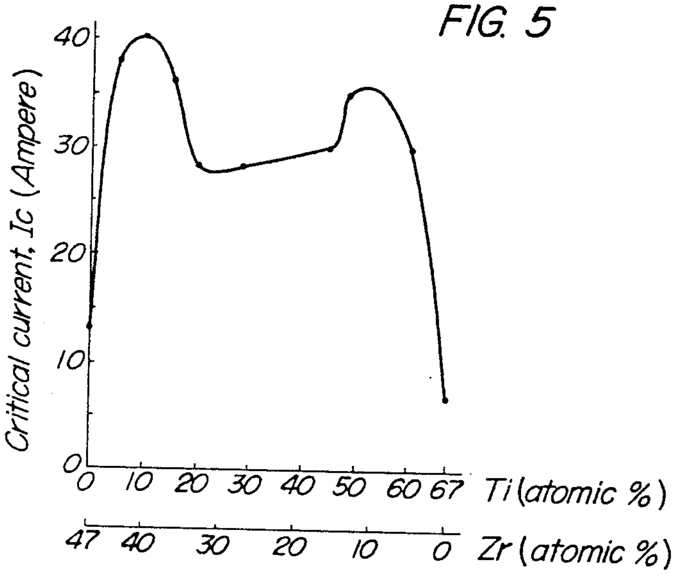
FIGURE 5 shows the relationship between the critical current of 0.25 mm. diameter samples and compositions lying on the line combining the point of 47% zirconium-53% niobium with the point 67% titanium-33% niobium in the triangle diagram of FIGURE 3*c*.
Figure 6:
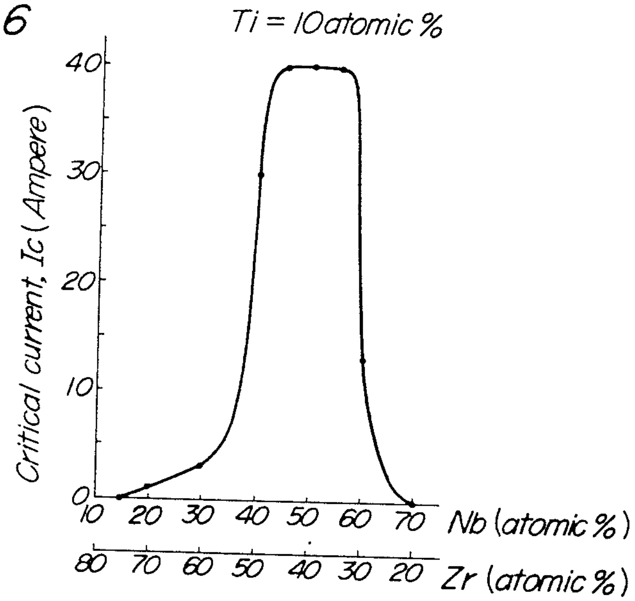
FIGURE 6 shows the relationship between the critical current of 0.25 mm. diameter samples and compositions lying on the line combining the point 90% niobium-10% titanium with the point 90% zirconium-10% titanium, in the triangle diagram of FIGURE 3*c*.
Figure 7:
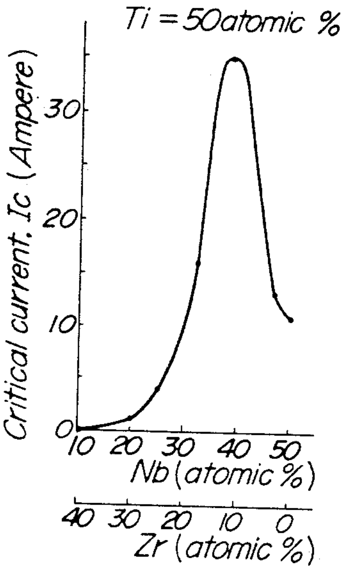
FIGURE 7 shows the relationship between the critical current of 0.25 mm. diameter samples and compositions lying on the line combining the point 50% niobium-50% titanium with the point 50% zirconium-50% titanium in the triangle diagram of FIGURE 3*c*.
Figure 8:
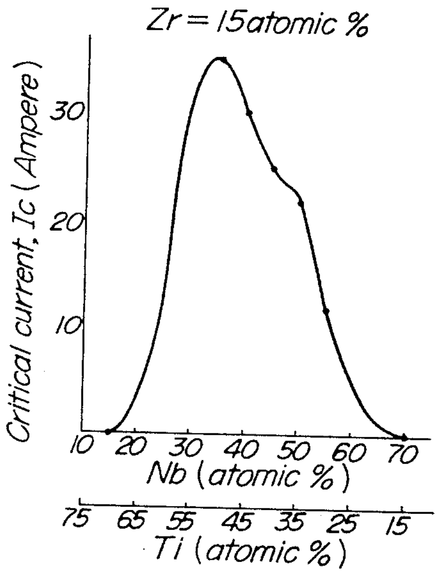
FIGURE 8 shows the relationship between the critical current of 0.25 mm. diameter samples and compositions lying on the line combining the point 85% niobium-15% zirconium with the point 85% titanium-15% zirconium, in the triangle diagram of FIGURE 3*c*.

As stated above, it is desirable if titanium is present in the ternary alloy in an amount greater than 1% from the standpoint of achieving a lower training effect and good plastic deformation, and FIGURES 4 and 5 clearly show that the addition of even 1% titanium is very effective in increasing the critical current.

As is apparent from FIGURE 3*c*, the critical current of alloys composed of about 28 to 53% niobium, about 1 to 27% zirconium and about 27 to 71% titanium, in a transverse magnetic field of about 80K oe. is generally about 20 to 35 amperes which is larger than that of the niobium-titanium binary alloys. Ternary alloys obtained by adding zirconium to niobium-titanium type binary alloys show less training effect. For example, in a transverse magnetic field of 20K oe., the critical current of a 50% niobium-50% titanium alloy vary from 12 to 14, 15, 17 and 18 amperes, finally stabilizing at 18 amperes. Thus, the critical current was brought to a stabilized value after five measurements. However, the ternary alloys of the present invention containing at least about 1% zirconium showed less training effect and the critical current, for example, of a 50% niobium-5% zirconium-45% titanium alloy was stabilized after only three measurements, the critical current changing from 45 to 46 and to 48 amperes, finally stabilizing at 48 amperes.

When the niobium content exceeds about 53%, the low current density resistive field of these alloys is lowered, so that the critical current in a magnetic field with a strength as high as 80K oe. drops off. With reference to FIGURE 3*c*, for example, whereas the critical current of a 50% niobium-20% zirconium-30% titanium alloy is 26 amperes, that of a 56% niobium-16% zirconium-28% titanium alloy is as low as 12 amperes. Also, when the niobium content decreases to an amount less than about 28%, the critical temperature of these alloys is lowered, so that the critical current in a magnetic field of a strength as high as 80K oe. drops off. From FIGURES 3*c* and 5, the zirconium content is preferably wtihin the range of about 1 to 27% and alloys having a zirconium content within this range have good deformability.

Since titanium is cheaper than niobium and zirconium, the alloys of the present invention are cheaper than niobium-zirconium type binary alloys.

The coil current degradations ($I_{coil}$) measured on a coil of 12 mm. inner diameter and 30 mm. in height made of the inventive alloys of the present invention are shown in Table 1 below in comparison with conventional binary alloys. Since coil current degradation frequently takes place in a transverse magnetic field of 20K oe., and since it is necessary to pass through this portion of the magnetic field in order to generate a high magnetic field strength of more than 20K oe., the following tests were conducted in a transverse magnetic field of 20K oe.

TABLE 1

| | Training Effect | $I_c$ (A) | $I_{coil}$ (A) | $I_c/I_{coil}$ |
|---|---|---|---|---|
| Nb-50% ZrL | Large | 130 | 19.3 | 7 |
| Nb-40% Zr-10% Ti | Substantially none. | 220 | 55 | 4 |
| Nb-5% Zr-55% Ti | Small | 48 | 40 | 1.2 |
| Nb-50% Ti | Observed | 18 | 4 | 4.5 |

From the above table it can be seen that in a transverse magnetic field of 20K oe., the ternary alloys of the present invention show very little coil current degradation as compared with niobium-zirconium and niobium-titanium type binary alloys. The alloys of the present invention show little degradation, either as they are, or after plating with a metal, such as for example, copper, aluminum or silver, which exhibit good thermal and electrical conductivity at very low temperatures. Furthermore, coating the surface of said plating with a polyimide resin and using it as a coil winding on a superconducting magnet for use in electron microscopes or for physical research, is highly effective. Moreover, strips or cables of said materials coated with copper, aluminum or silver may be used as a saddle-shaped superconducting magnet for magnetic hydrodynamic generators or as a superconducting magnet for nuclear accelerators or other devices, with an improved result. The alloys of the present invention are particularly effective when used in the coils of magnets which provide the driving force in submarines.

In producing the alloys of the present invention, the crude material niobium contains tantalum and vanadium, and the crude material zirconium and titanium contain hafnium as inseparable elements, but these elements do not substantially influence the superconductivity of the resultant alloys if their contents are less than about 5 atomic percent. The amount of other impurities, such as silicon, iron, aluminum, and oxygen present in said crude materials are advantageously less than about 1 atomic percent.

Since modifications of this invention will be apparent to those skilled in the art, it is not desired to limit the invention to the exact constitution shown and described. Accordingly, all suitable modifications and equivalents may be resorted to which fall within the scope of the appended claims.

It is claimed:

1. A superconducting magnet containing at least one coil made of an alloy exhibiting under superconductive conditions a relatively high resistive critical field and an improved critical current density even in a strong applied magnetic field of about 80K oe., said alloy consisting essentially of about 20 to 63 atomic percent of niobium, about 1 to 79 atomic percent of zirconium, and about 1 to 79 atomic percent of titanium.

2. The superconducting magnet of claim 1, wherein said alloy has a composition which falls within the region of FIGURE 3*a*, defined by the straight lines which connect the following points: 63% niobium, 36% zirconium, 1% titanium; 63% niobium, 27% zirconium, 10% titanium; 52% niobium, 1% zirconium, 47% titanium; 20% niobium, 1% zirconium, 79% titanium; 20% niobium, 12% zirconium, 68% titanium; and 40% niobium, 59% zirconium, 1% titanium.

3. The superconducting magnet of claim 1, wherein said alloy consists essentially of about 37 to 59 atomic percent of niobium, about 29 to 53 atomic percent of zirconium and about 1 to 21 atomic percent of titanium.

4. The superconducting magnet of claim 1, wherein said alloy consists essentially of about 28 to 53 atomic percent of niobium, about 1 to 27 atomic percent of zirconium and about 27 to 71 atomic percent of titanium.

5. The superconducting magnet of claim 1, wherein said alloy consists essentially of about 20 to 63 atomic percent of niobium, about 1 to 20 atomic percent of zirconium and the essential remainder being titanium.

6. A superconducting magnetic field generating device containing at least one coil of an alloy exhibiting under superconductive conditions a relatively high resistive critical field and an improved critical current density even in a strong applied magnetic field of about 80K oe., said alloy consisting essentially of about 20 to 63 atomic percent of niobium, about 1 to 79 atomic percent of zirconium, and about 1 to 79 atomic percent of titanium.

7. The superconducting device of claim 6, wherein said alloy has a composition which falls within the region of FIGURE 3*a* defined by the straight lines which connect the following points: 63% niobium, 36% zirconium, 1% titanium; 63% niobium, 27% zirconium, 10% titanium; 52% niobium, 1% zirconium, 47% titanium; 20% niobium, 1% zirconium, 79% titanium; 20% niobium, 12% zirconium, 68% titanium; and 40% niobium, 59% zirconium, 1% titanium.

8. The superconducting device of claim 6, wherein said alloy consists essentially of about 37 to 59 atomic percent of niobium, about 29 to 53 atomic percent of zirconium and about 1 to 21 atomic percent of titanium.

9. The superconducting device of claim 6, wherein said alloy consists essentially of about 28 to 53 atomic percent of niobium, about 1 to 27 atomic percent of zirconium and about 27 to 71 atomic percent of titanium.

10. The superconducting device of claim 6, wherein said alloy consists essentially of about 20 to 63 atomic percent of niobium, about 1 to 20 atomic percent of zirconium and the essential remainder being titanium.

11. In a process for generating a magnetic field by the use of a superconducting magnet containing at least one coil made of an alloy having superconductivity at a temperature below its critical temperature, the improvement which comprises using at least one coil made of an alloy exhibiting under superconductive conditions a relatively high resistive critical field and an improved critical current density even in a strong applied magnetic field of about 80K oe., said alloy consisting essentially of about 20 to 63 atomic percent of niobium, about 1 to 79 atomic percent of zirconium, and about 1 to 79 atomic percent of titanium.

References Cited

UNITED STATES PATENTS

| | | | |
|---|---|---|---|
| 2,985,531 | 5/1961 | Gordon et al. | 75—177 X |
| 3,038,798 | 6/1962 | Berger et al. | 75—177 X |
| 3,215,569 | 11/1965 | Kneip et al. | 158—133 |
| 3,253,191 | 5/1966 | Treuting et al. | 317—158 |
| 3,266,950 | 8/1966 | Zwicker | 75—174 X |
| 3,268,373 | 8/1966 | Reynolds | 148—174 X |
| 3,303,065 | 2/1967 | Reynolds | 148—174 X |

OTHER REFERENCES

Nuclear Science Abstracts, vol. 20, No. 16, Aug. 31, 1966, relied on pp. 3628 and 3529.

CHARLES N. LOVELL, *Primary Examiner.*